United States Patent
Bean et al.

(10) Patent No.: US 7,164,500 B2
(45) Date of Patent: Jan. 16, 2007

(54) METHOD AND APPARATUS FOR THE AUTOMATIC GENERATION OF IMAGE CAPTURE DEVICE CONTROL MARKS

(75) Inventors: Heather N Bean, Fort Collins, CO (US); Mark N. Robins, Greeley, CO (US); Matthew Flach, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1202 days.

(21) Appl. No.: 10/060,897
(22) Filed: Jan. 29, 2002

(65) Prior Publication Data
US 2003/0142359 A1    Jul. 31, 2003

(51) Int. Cl.
*H04N 1/40* (2006.01)
*G06K 9/34* (2006.01)
*G06K 1/00* (2006.01)
*G06T 7/00* (2006.01)

(52) U.S. Cl. ............... 358/2.1; 358/462; 358/3.28; 358/471; 382/173; 382/175; 382/176; 382/306; 382/317; 235/494

(58) Field of Classification Search ............. 358/1.9, 358/2.1, 2.99, 3.01, 3.24, 462, 3.28, 453, 358/471, 474; 382/173, 175, 176, 317, 306, 382/282, 286, 287, 291, 292; 235/454, 470, 235/426.01, 426.13, 494
See application file for complete search history.

(56) References Cited

U.S. PATENT DOCUMENTS

| | | | | |
|---|---|---|---|---|
| 4,110,020 A | * | 8/1978 | Johnson et al. | 235/462.05 |
| 4,589,144 A | * | 5/1986 | Namba | 382/175 |
| 5,003,613 A | * | 3/1991 | Lovelady et al. | 382/163 |
| 5,568,571 A | * | 10/1996 | Willis et al. | 382/254 |

* cited by examiner

*Primary Examiner*—Scott A. Rogers
(74) *Attorney, Agent, or Firm*—Leslie P. Gehman

(57) ABSTRACT

Image capture device control marks are automatically generated within a computer or printer and automatically printed on pages output from the printer. The control marks when detected by a control mark capable image capture device communicate information to the image capture device such as which areas of the printed page are text that require optical character recognition, which areas of the page are photos that require high-resolution full-color, which areas of the page are line drawings that require medium-resolution black and white, and which areas of the page are not to be scanned. Image capture device control marks may be configured in a wide range of sizes, styles, and locations on the printed page.

30 Claims, 10 Drawing Sheets

METHOD AND APPARATUS FOR THE AUTOMATIC GENERATION OF IMAGE CAPTURE DEVICE CONTROL MARKS

FIELD OF THE INVENTION

This invention relates generally to the field of computer hardware and methods and more specifically to the field of computer printing and image capture hardware and methods.

BACKGROUND OF THE INVENTION

Many current image capture devices, such as scanners, are capable of operating in a variety of modes. Some common modes are low-resolution black and white scanning for preview and non-critical graphic information, high-resolution black and white scanning for text to be passed to an optical character recognition (OCR) process, and high-resolution full-color scanning for color photos. If speed, memory and file storage space were not a concern, scanners could always scan in their highest-resolution full-color mode and the user could later convert portions of the page to other less memory intensive modes. However, computers with such high speed and large capacities are a distinct minority in the community of computers. Often multiple users will share a single computer system, requiring each user to conserve storage space that is shared among the users. Older computers and some portable systems, such as cameras, laptop computers, and personal digital assistants (PDAs), may be limited in their processor speed, memory, and storage space. Also, scanners typically are slower to scan when in high-resolution full-color mode causing excessive delays for the user.

SUMMARY OF THE INVENTION

Image capture device control marks are automatically generated within a computer or printer and automatically printed on pages output from the printer. The control marks when detected by a control mark capable image capture device communicate information to the image capture device such as which areas of the printed page are text that require optical character recognition, which areas of the page are photos that require high-resolution full-color, which areas of the page are line drawings that require medium-resolution black and white, and which areas of the page are not to be scanned. Image capture device control marks may be configured in a wide range of sizes, styles, and locations on the printed page.

Other aspects and advantages of the present invention will become apparent from the following detailed description, taken in conjunction with the accompanying drawings, illustrating by way of example the principles of the invention.

DETAILED DESCRIPTION

Figure 1:
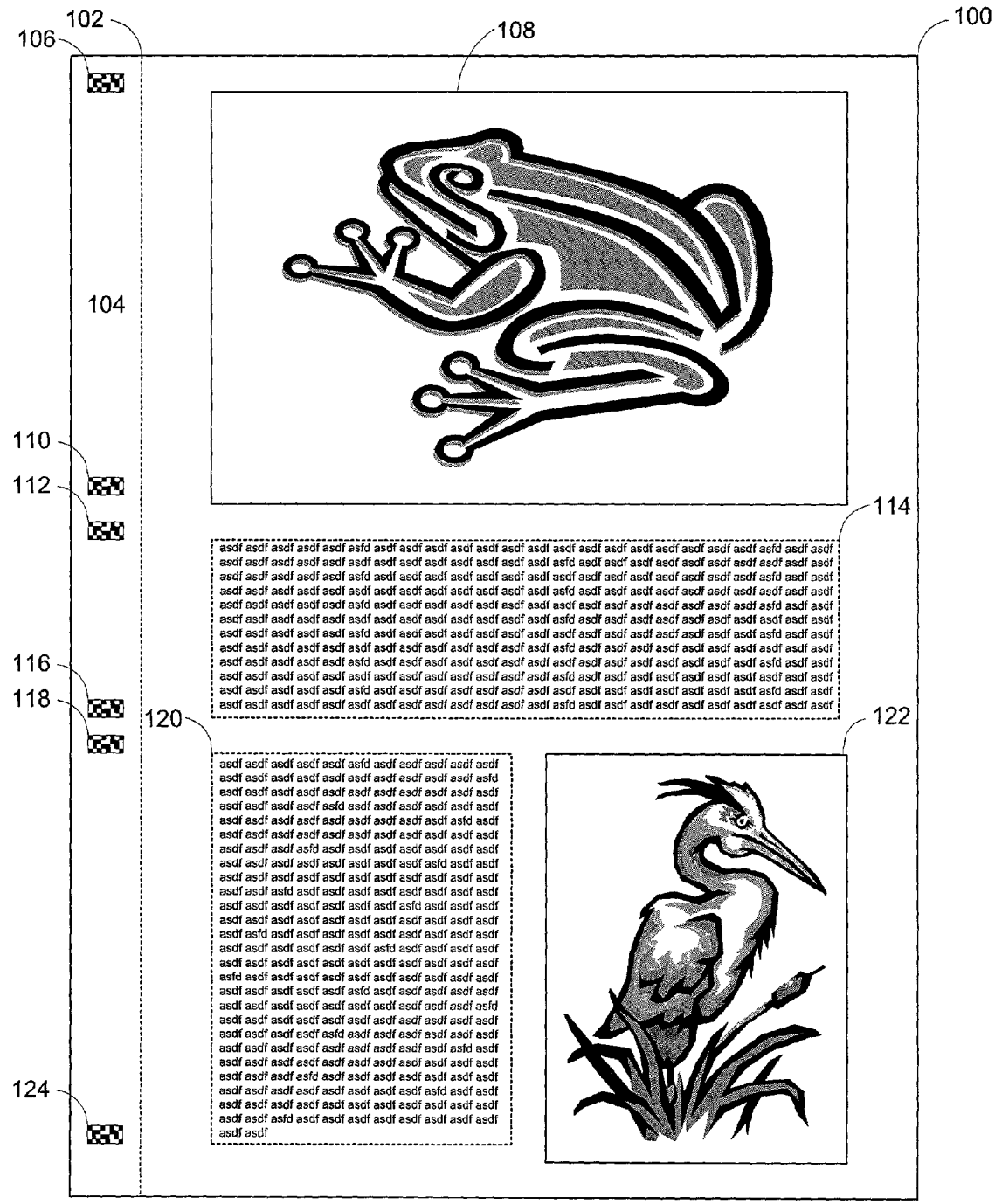
FIG. 1 is an example embodiment of a page including automatic generated image capture device control marks according to the present invention.

FIG. 1 is an example embodiment of a page including automatic generated image capture device control marks according to the present invention. A printed page 100 including a control mark area 104, a first photo 108, a first text block 114, a second text block 120, and a second photo 122 is printed using a method and apparatus for the automatic generation of image capture device control marks according to the present invention. The size, shape and location of the control mark area 104 may vary widely within the scope of the present invention. The control mark area 104 does not require the presence of a boundary line 102 as shown in the example embodiment of FIG. 1. Image capture device control marks may be produced according to a wide variety of styles. The scanner control marks included in the example embodiment of a printed page shown in FIG. 1 are simply rectangles containing black and white squares encoding scanner control information. Other embodiments of the present invention may create control marks configured for image capture devices such as digital cameras. Since cameras are often handheld, the camera may capture a full resolution image, later process the control marks, and reduce resolution for areas of the image where high resolution is not required. The first scanner control mark 106 may tell the scanner the size and starting location of a black and white gray scale image, such as that of the first photo 108 in FIG. 1. The second scanner control mark 110 may contain the ending location of the first photo 108 in FIG. 1. The third scanner control mark 112 may contain information about the starting location, font size and font type of the first text block 114 of FIG. 1. The fourth scanner control mark 116 may contain information about the ending location of the first text block 114 of FIG. 1. The fifth scanner control mark 118 may contain information about the starting location, size, and type of photo for the second photo 122, along with information about the starting location, size, font size, and font type of the second text block 120. The sixth scanner control mark 124 may contain information about the ending location of the second photo 122, along with information about the ending location of the second text block 120. The location of the scanner control marks may be used to communicate to the scanner information about the location and extent of illustrations, charts, or text blocks on the page. In this embodiment of the present invention, the image capture device control marks are specific to a scanner, however in other embodiments of the present invention the control marks may be used by other image capture devices, such as a digital camera, within the scope of the present invention.

Image capture device control marks may be placed in a very wide variety of places on a printed page within the scope of the present invention. For example, control marks may be placed in between region types, all at the top, bottom or a side of a page, just above a region, or most any place within the printed page. It is also possible within the scope of the present invention to place image capture device control marks in hidden locations on a printed page. For example, a decorative border may contain image capture device information such that an ordinary user may not even notice the presence of the marks, or what appear to be random dots along the edges of the page may actually be image capture device control marks. Also, the image capture device control marks may be hidden within text or images on the page such that they are unobtrusive to the user, but recognized by the image capture device.

Image capture device control marks may also be general instructions to the image capture device that simply tell it how to respond when it detects text areas or image areas without needing to include location information about the text or image areas on the page. This embodiment of the present invention is useful with image capture devices or software that include the capability of detecting text and image areas within the printed page.

Figure 2:
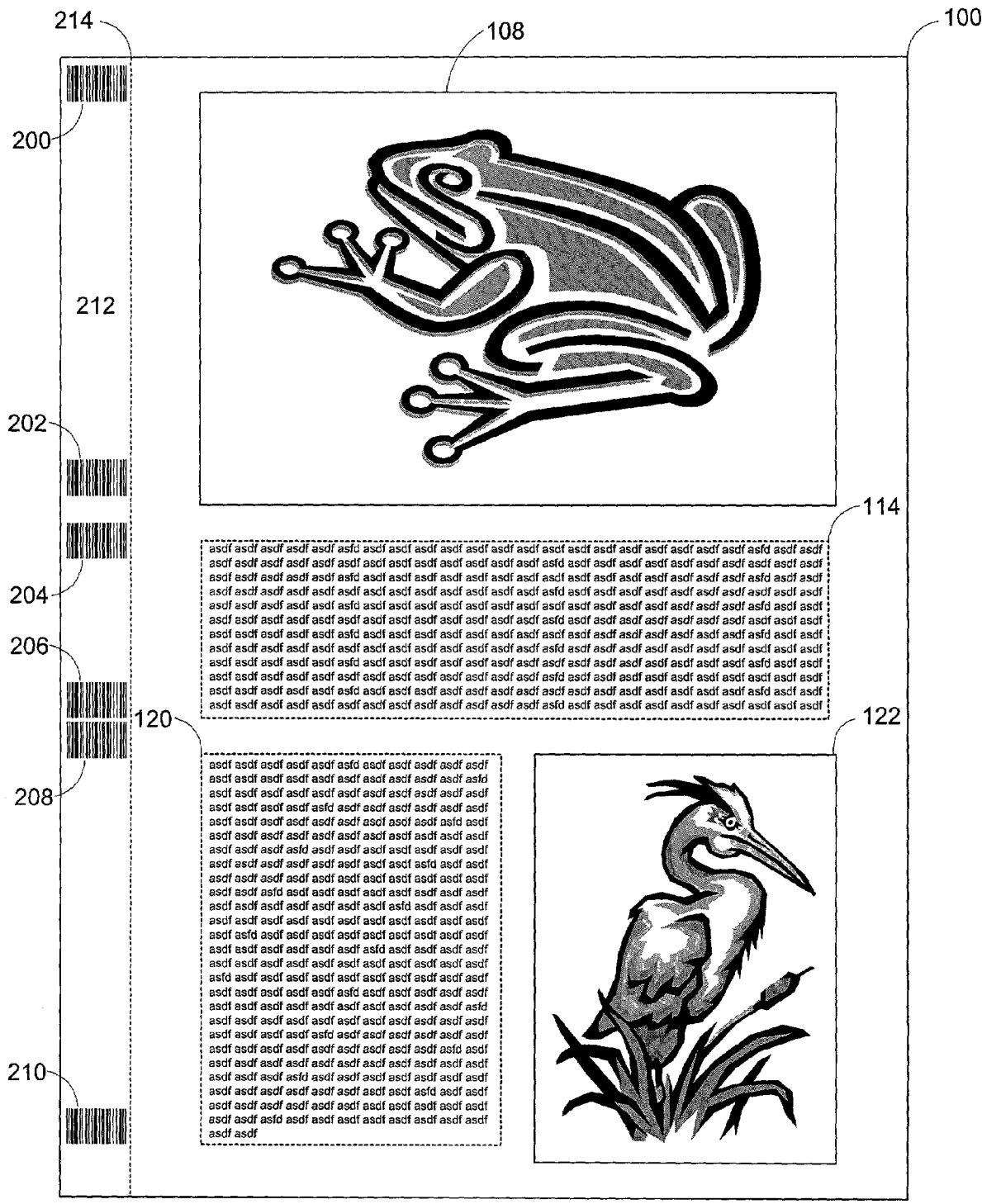
FIG. 2 is an example embodiment of a page including automatic generated image capture device control marks according to the present invention.

FIG. 2 is an example embodiment of a page including automatic generated image capture device control marks according to the present invention. The example embodiment of a printed page shown in FIG. 2 is similar to that shown in FIG. 1 except that the scanner control marks in FIG. 2 are bar codes. A printed page 100 including a control mark area 212, a first photo 108, a first text block 114, a second text block 120, and a second photo 122 is printed using a method and apparatus for the automatic generation of image capture device control marks according to the present invention. The size, shape and location of the control mark area 212 may vary widely within the scope of the present invention. The control mark area 212 does not require the presence of a boundary line 214 as shown in the example embodiment of FIG. 2. Image capture device control marks may be produced according to a wide variety of styles. The control marks included in the example embodiment of a printed page shown in FIG. 2 are simply small bar codes encoding scanner control information. Any of the types of bar code encoding may be used within the scope of the present invention. The first scanner control mark 200 may tell the scanner the size and starting location of a black and white gray scale image, such as that of the first photo 108 in FIG. 2. The second scanner control mark 202 may contain the ending location of the first photo 108 in FIG. 2. The third scanner control mark 204 may contain information about the starting location, font size and font type of the first text block 114 of FIG. 2. The fourth scanner control mark 206 may contain information about the ending location of the first text block 114 of FIG. 2. The fifth scanner control mark 208 may contain information about the starting location, size, and type of photo for the second photo 122, along with information about the starting location, size, font size, and font type of the second text block 120. The sixth scanner control mark 210 may contain information about the ending location of the second photo 122, along with information about the ending location of the second text block 120. The location of the scanner control marks may be used to communicate to the scanner information about the location and extent of illustrations, charts, or text blocks on the page.

Figure 3:
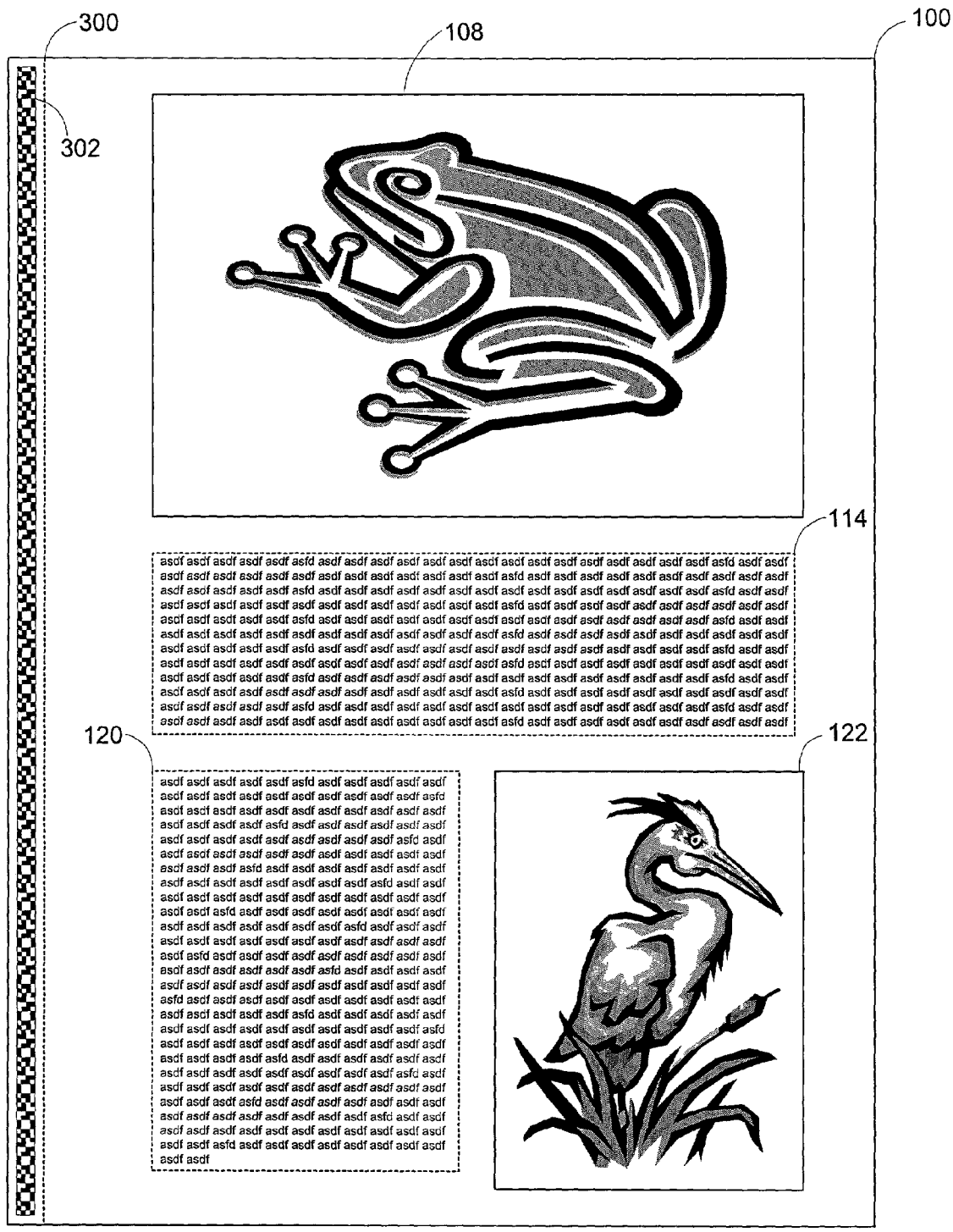
FIG. 3 is an example embodiment of a page including automatic generated image capture device control marks according to the present invention.

FIG. 3 is an example embodiment of a page including automatic generated image capture device control marks according to the present invention. The example embodiment of a printed page shown in FIG. 3 is similar to that shown in FIG. 1 except that the image capture device control mark in FIG. 3 is a single control mark 302 containing all of the scanner control information required for the page 100. A printed page 100 including an image capture device control mark 302, a first photo 108, a first text block 114, a second text block 120, and a second photo 122 is printed using a method and apparatus for the automatic generation of image capture device control marks according to the present invention. The size, shape and location of the image capture device control mark 302 may vary widely within the scope of the present invention. The control mark 302 does not require the presence of a boundary line 300 as shown in the example embodiment of FIG. 3. Scanner control marks may be produced according to a wide variety of styles. The scanner control mark included in the example embodiment of a printed page shown in FIG. 3 is simply a rectangle containing black and white squares encoding scanner control information.

Figure 4:
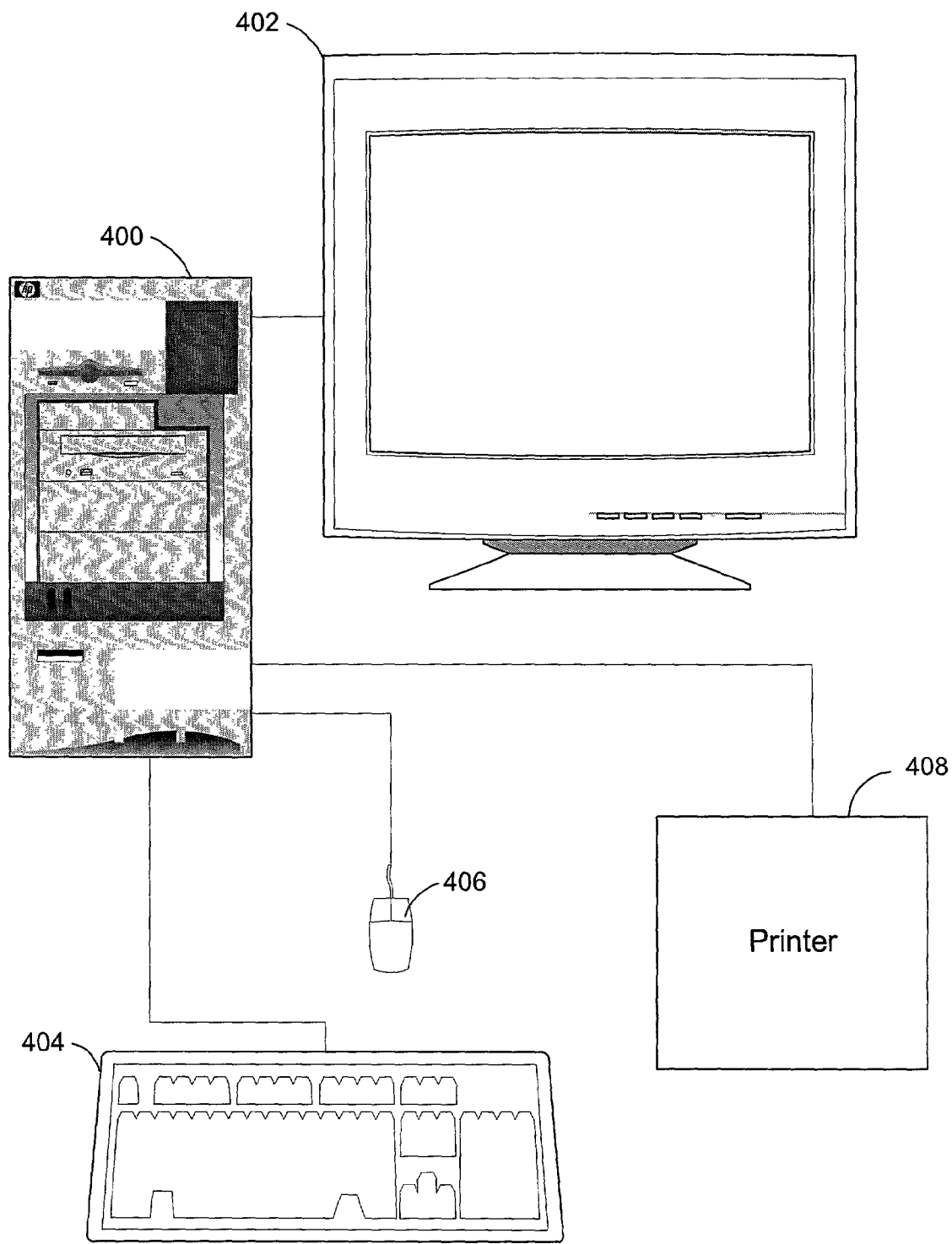
FIG. 4 is an example embodiment of a computer system including a method and apparatus for the automatic generation of image capture device control marks according to the present invention.

FIG. 4 is an example embodiment of a computer system including a method and apparatus for the automatic generation of image capture device control marks according to the present invention. The example computer system shown in FIG. 4 includes a computer 400, a display 402, a keyboard 404, a mouse 406, and a printer 408. The method and apparatus for the automatic generation of image capture device control marks according to the present invention may reside in either the computer 400 or the printer 408. Within the computer 400, the method and apparatus for the automatic generation of image capture device control marks may comprise software stored on magnetic media, firmware stored within a non-volatile memory, or as a hardware board. Within the printer 408, the method and apparatus for the automatic generation of image capture device control marks may comprise software stored on magnetic media, firmware stored within a non-volatile memory, or be part of the printer's electronic hardware.

Figure 5:
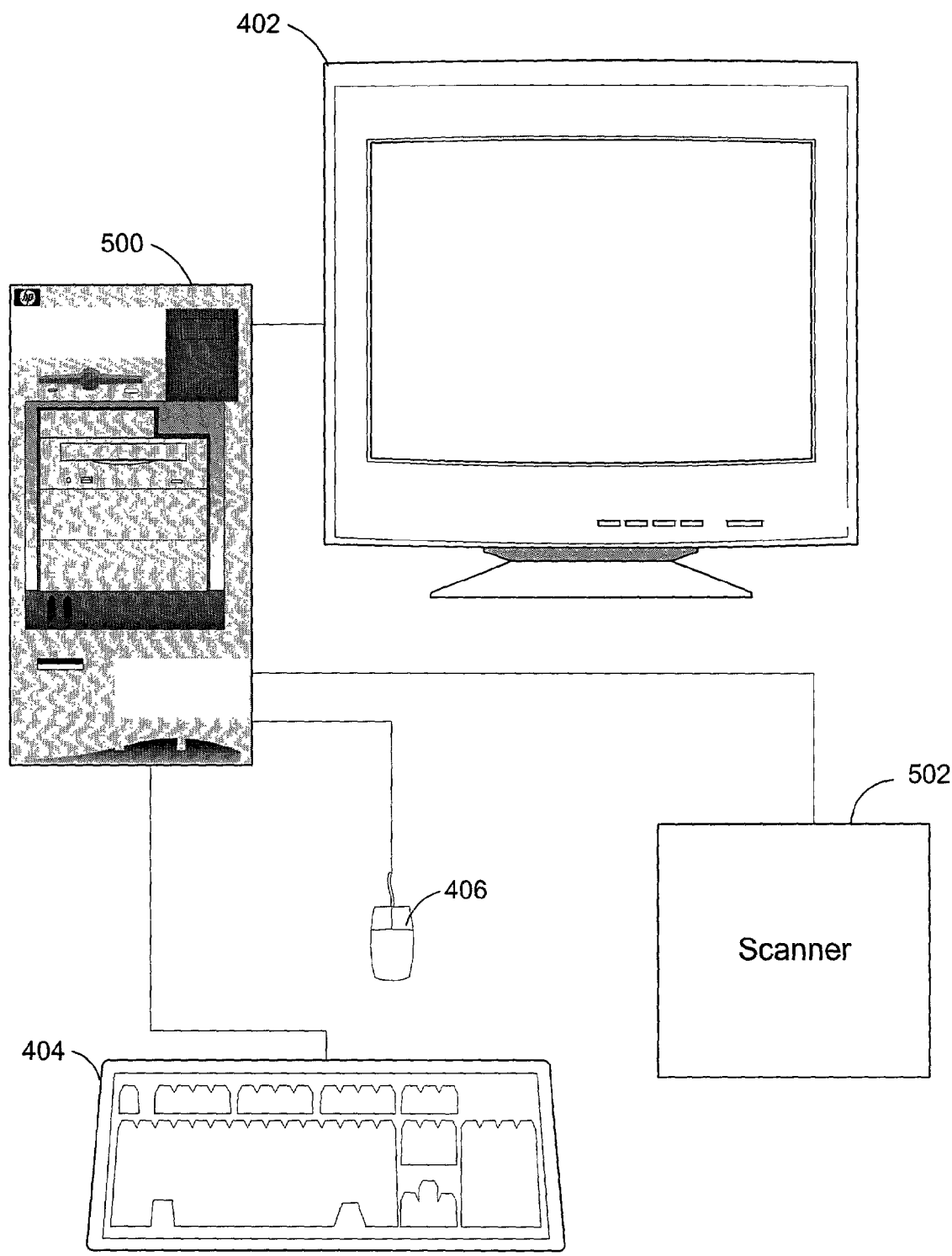
FIG. 5 is an example embodiment of a computer system including a method and apparatus for the automatic control of an image capture device according to the present invention.

FIG. 5 is an example embodiment of a computer system including a method and apparatus for the automatic control of an image capture device according to the present invention. The example computer system shown in FIG. 5 includes a computer 500, a display 402, a keyboard 404, a mouse 406, and a scanner 502. The method and apparatus for the automatic detection of scanner control marks according to the present invention may reside in either the computer 400 or the scanner 502. Note that while this example embodiment of the present invention includes a scanner, other embodiments may include other image capture devices, such as digital cameras, within the scope of the present invention. Within the computer 400, the method and apparatus for the automatic detection of scanner control marks may comprise software stored on magnetic media, firmware stored within a non-volatile memory, or as electronic hardware. Within the scanner 502, the method and apparatus for the automatic generation of scanner control marks may comprise software stored on magnetic media, firmware stored within a nonvolatile memory, or as part of the scanner's electronic hardware.

Figure 6:
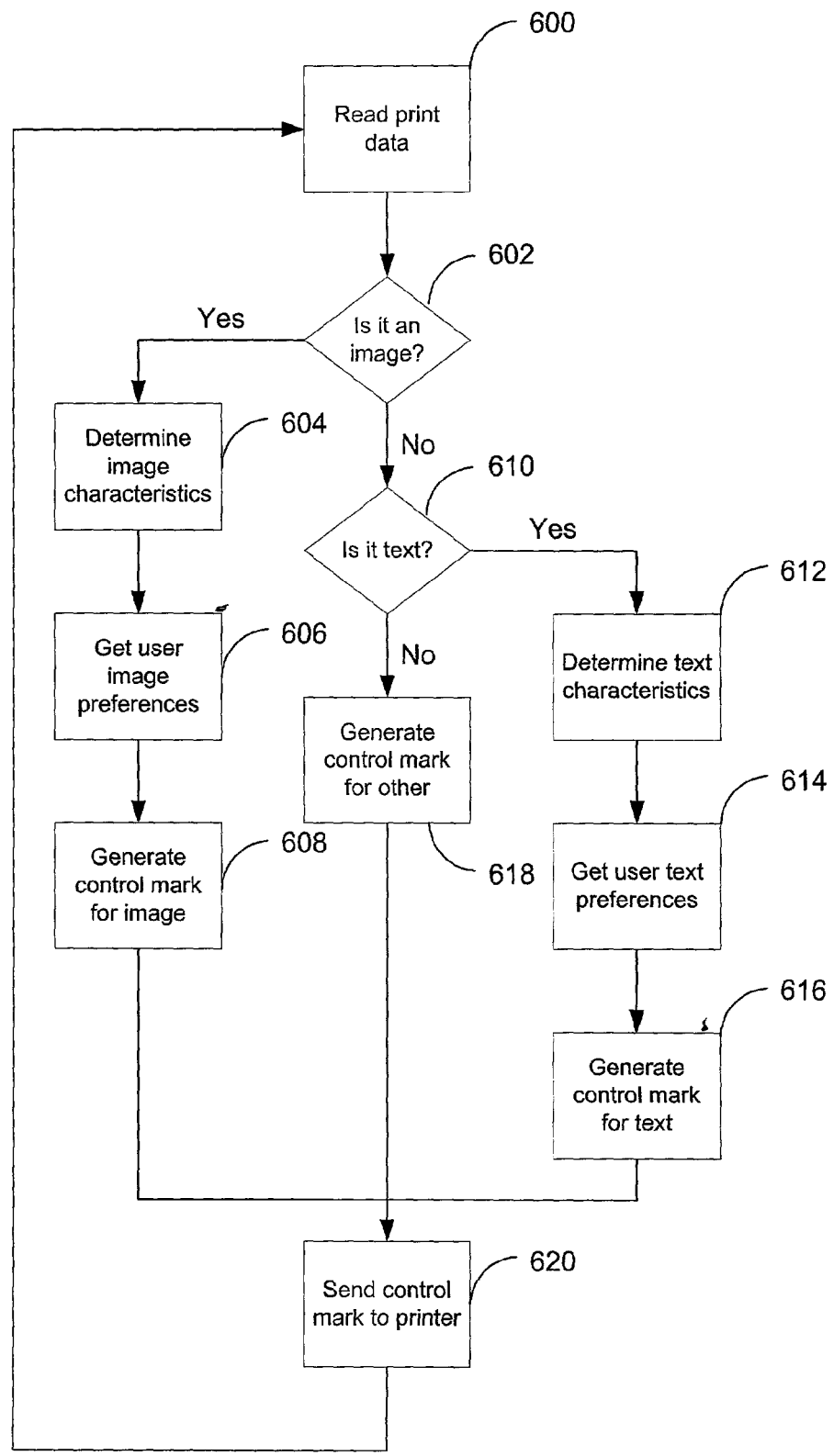
FIG. 6 is a flow chart of an example embodiment of a method for the automatic generation of image capture device control marks according to the present invention.

FIG. 6 is a flow chart of an example embodiment of a method for the automatic generation of image capture device control marks according to the present invention. In a step 600 printer data is read. In a decision step 602 the printer data is parsed to determine if it contains an image. If it contains an image, control is passed to a step 604 where the image characteristics are determined. Optionally, further information may be obtained about the image and incorporated into the control marks. For example, characteristics such as whether the image is color or black and white, whether the image is gray scale or a line drawing may be included in the image characteristics that are determined. Then, in a step 606 any user image preferences are read, and in a step 608 an image scanner control mark is generated. The image scanner control mark may contain a wide variety of information within the scope of the present invention. It may contain the name of the image, the source of the image, the directory in which to save the scanned image, the size and resolution of the image, or the type of image. If the data does not contain an image, decision step 602 passes control to a decision step 610 where the data is parsed to determine if it contains text. If it contains text, control is passed to a step 612 where the text characteristics are determined. Then, in a step 614 any user text preferences are read, and in a step 616 a text control mark is generated. The text control mark may contain a wide variety of information within the scope of the present invention. For example, it may contain instructions telling the scanner to run an optical character recognition (OCR) program on the text, where to store the text, what to name the resulting text file, or the size and font of the text. If the data does not contain text, decision step 610 passes control to a step 618 where an other control mark is generated. The other control mark may contain a wide variety of information within the scope of the present invention. For example, at the end of each printer page, an other control mark may be generated telling the image capture device what file name to use and where to save the captured image. After step 608, 616, or 618, in a step 620 the image capture device control mark is sent to the printer and control is returned to a step 600 where more printer data is read.

Figure 7:
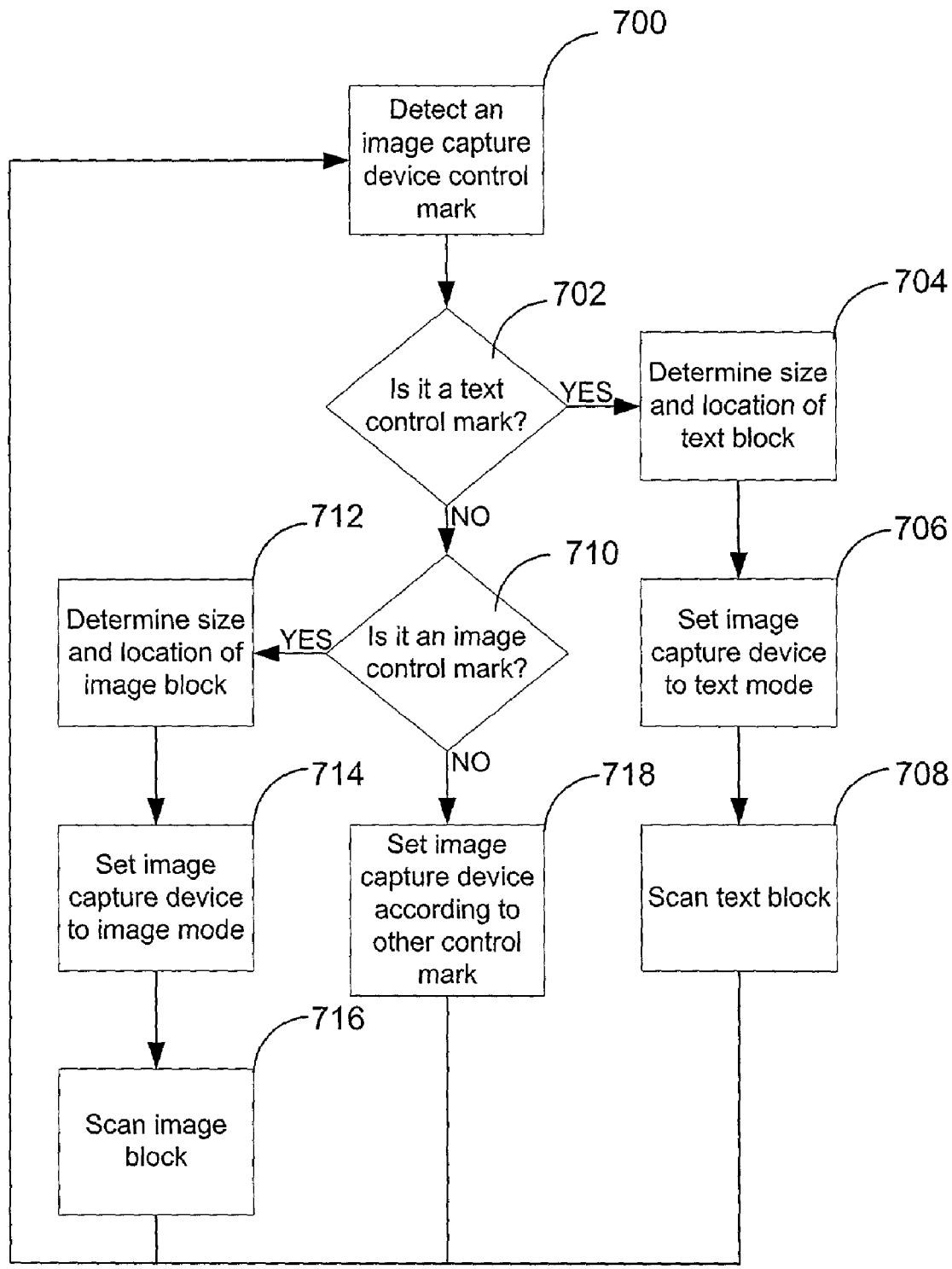
FIG. 7 is a flow chart of an example embodiment of a method for the automatic control of an image capture device according to the present invention.

FIG. 7 is a flow chart of an example embodiment of a method for the automatic control of an image capture device according to the present invention. In a step 700 an image capture device control mark is detected. In a decision step 702, if it is a text control mark, control is passed to a step 704 where the text control mark is read to determine the size and location of the text block. Then, in a step 706 the image capture device mode is set as directed by the text control mark, and in a step 708 the text is scanned. In decision step 702, if the image capture device control mark is not a text control mark, control is passed to a decision step 710, where it is determined if the control mark is an image control mark. If it is an image control mark, control is passed to a step 712 where the image control mark is read to determine the size and location (or other characteristics) of the image block. Then, in a step 714 the image capture device mode is set as directed by the image control mark, and in a step 716 the image is captured. In decision step 710, if the control mark is not an image control mark, it must be an other control mark and control is passed to a step 718 where the image capture device is set according to the data contained in the other control mark. Note that this is simply one example embodiment of a method of detecting and reacting to image capture device control marks. Many different characteristics and commands may be encoded within the control marks, and the image capture device will decode and act upon all of the commands it is capable of carrying out. Some image capture devices may not be configured to act upon all of the possible variations of control marks, yet they may act upon a subset of the control marks within the scope of the present invention. Many variations on this process are possible within the scope of the present invention.

Figure 8:
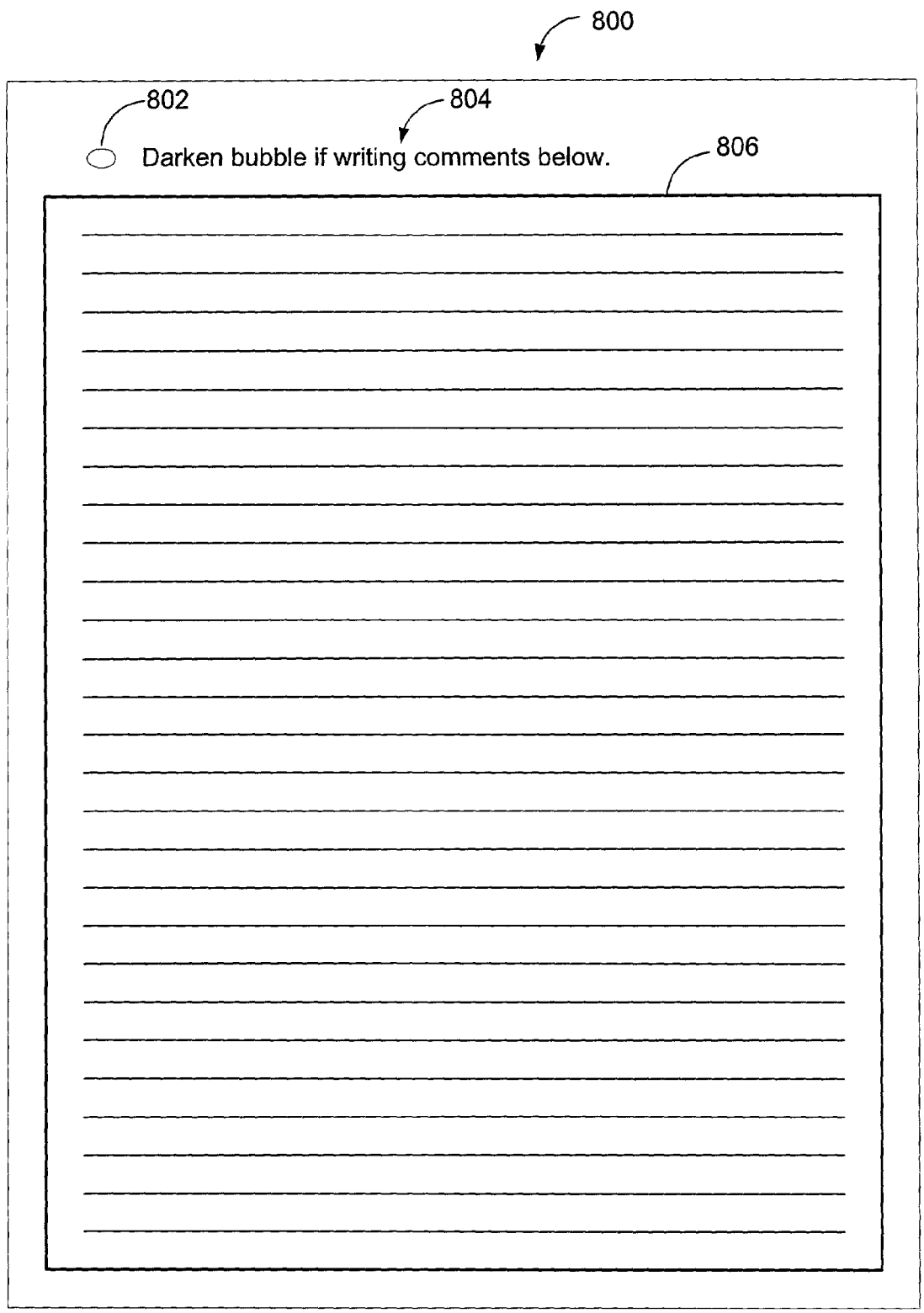
FIG. 8 is an example embodiment of a page including a user modifiable image capture device control mark according to the present invention.

Image capture device control marks may also be created or modified by a user. For example, a form may contain a quantity of bubbles that users darken to indicate the types of data contained in the form. If a particular bubble is filled in, it may flag that the user has hand written in comments that need to be scanned as an image. FIG. 8 shows one example form including bubbles according to the present invention. A form 800 is created including a bubble 802, an instruction 804, and a comment area 806. The instruction in this example embodiment according to the present invention tells the user to darken the bubble 802 if the user writes comments in the comment area 806. An image capture device built according to the present invention may detect whether or not the bubble 802 and been filled in by the user and capture the comment area 806 if the user has indicated the presence of comments, or ignore the comment area 806 (saving processing time and memory space) if there are no comments.

Figure 9:
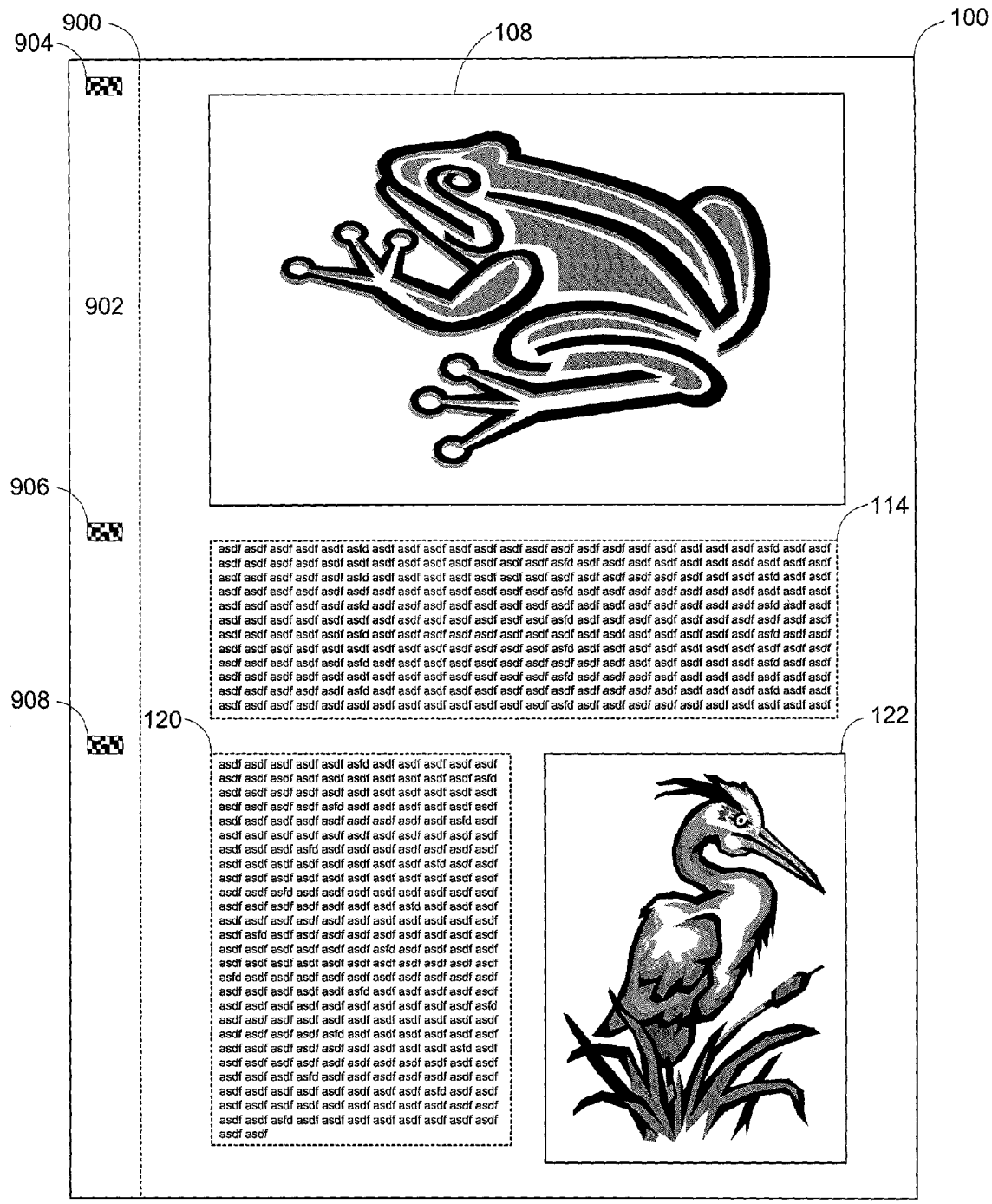
FIG. 9 is an example embodiment of a page including automatic generated image capture device control marks according to the present invention.

FIG. 9 is an example embodiment of a page including automatic generated image capture device control marks according to the present invention. The page shown in FIG. 9 is similar to that of FIG. 1 except that the control marks in FIG. 9 include starting location and length of the image blocks and do not require an ending control mark. A printed page 100 including a control mark area 104, a first photo 108, a first text block 114, a second text block 120, and a second photo 122 is printed using a method and apparatus for the automatic generation of image capture device control marks according to the present invention. The size, shape and location of the control mark area 902 may vary widely within the scope of the present invention. The control mark area 902 does not require the presence of a boundary line 900 as shown in the example embodiment of FIG. 9. Image capture device control marks may be produced according to a wide variety of styles. The scanner control marks included in the example embodiment of a printed page shown in FIG. 9 are simply rectangles containing black and white squares encoding scanner control information. Other embodiments of the present invention may create control marks configured for image capture devices such as digital cameras. Since cameras are often handheld, the camera may capture a full resolution image, later process the control marks, and reduce resolution for areas of the image where high resolution is not required. The first scanner control mark 904 may tell the scanner the size and location of a black and white gray scale image, such as that of the first photo 108 in FIG. 9. The second scanner control mark 906 may contain information about the location, size, font size, and font type of the first text block 114 of FIG. 9. The third scanner control mark 908 may contain information about the location, size, and type of photo for the second photo 122, along with information about the location, size, font size, and font type of the second text block 120. The location of the scanner control marks may be used to communicate to the scanner information about the location and extent of illustrations, charts, or text blocks on the page. In this embodiment of the present invention, the image capture device control marks are specific to a scanner, however in other embodiments of the present invention the control marks may be used by other image capture devices, such as a digital camera, within the scope of the present invention.

Figure 10:
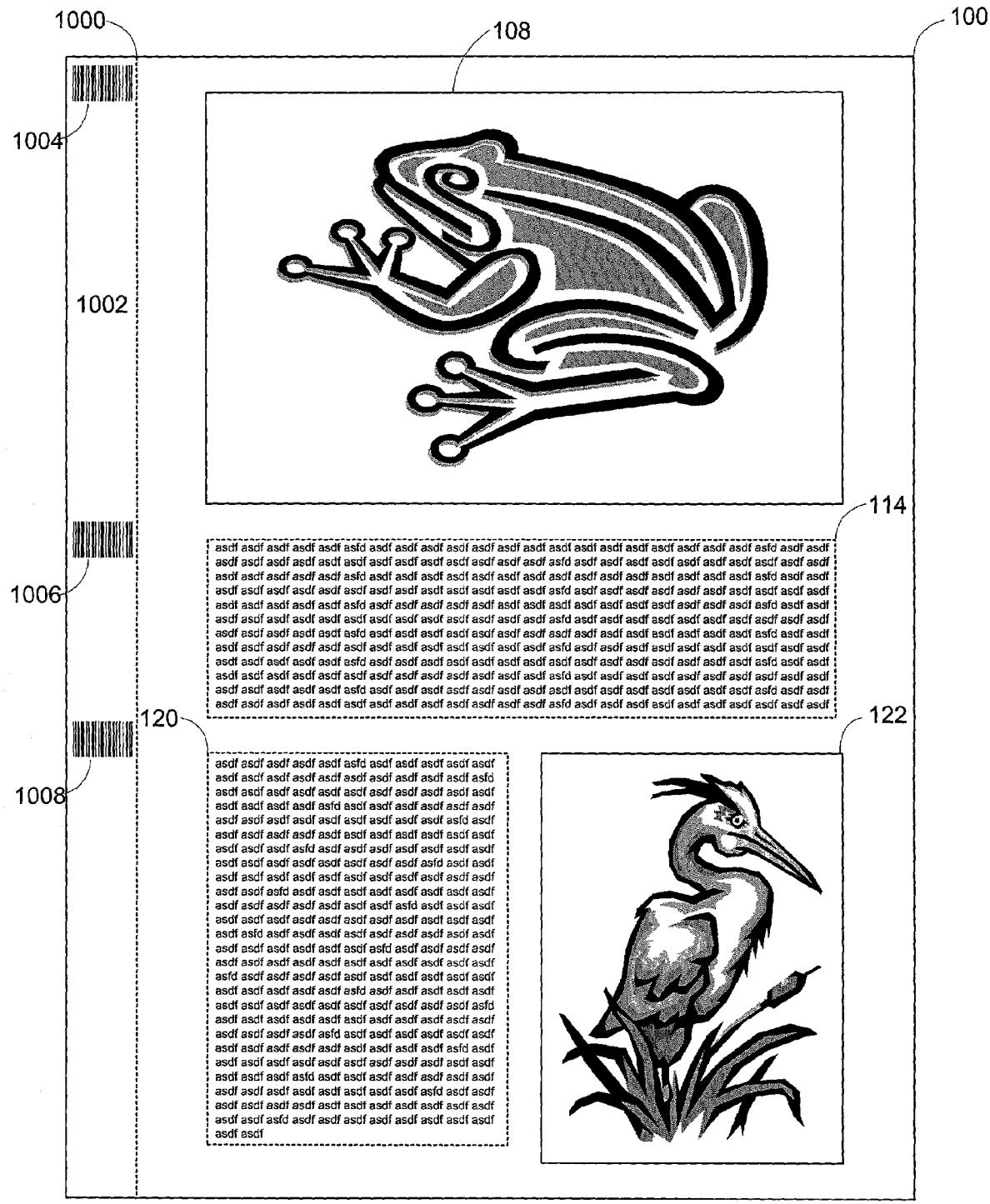
FIG. 10 is an example embodiment of a page including automatic generated image capture device control marks according to the present invention.

FIG. 10 is an example embodiment of a page including automatic generated image capture device control marks according to the present invention. The page shown in FIG. 10 is similar to that of FIG. 2 except that the control marks in FIG. 10 include starting location and length of the image blocks and do not require an ending control mark. The example embodiment of a printed page shown in FIG. 10 is similar to that shown in FIG. 9 except that the scanner control marks in FIG. 10 are bar codes. A printed page 100 including a control mark area 1002, a first photo 108, a first text block 114, a second text block 120, and a second photo 122 is printed using a method and apparatus for the automatic generation of image capture device control marks according to the present invention. The size, shape and location of the control mark area 1002 may vary widely within the scope of the present invention. The control mark area 1002 does not require the presence of a boundary line 1000 as shown in the example embodiment of FIG. 10. Image capture device control marks may be produced according to a wide variety of styles. The control marks included in the example embodiment of a printed page shown in FIG. 10 are simply small bar codes encoding scanner control information. Any of the types of bar code encoding may be used within the scope of the present invention. The first scanner control mark 1004 may tell the scanner the size and location of a black and white gray scale image, such as that of the first photo 108 in FIG. 10. The second scanner control mark 1006 may contain information about the location, font size and font type of the first text block 114 of FIG. 10. The third scanner control mark 1008 may contain information about the location, size, and type of photo for the second photo 122, along with information about the location, size, font size, and font type of the second text block 120. The location of the scanner control marks may be used to communicate to the scanner information about the location and extent of illustrations, charts, or text blocks on the page.

The method and apparatus used to control image capture devices with control marks are described further in a U.S. patent application Ser. No. 10/060,896, 'Method and Apparatus for Automatic Image Capture Device Control', filed concurrently with the present application, and incorporated herein by reference.

The foregoing description of the present invention has been presented for purposes of illustration and description. It is not intended to be exhaustive or to limit the invention to the precise form disclosed, and other modifications and variations may be possible in light of the above teachings. The embodiments were chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. A computer system comprising:
   at least one of either;
   an image detector configured to detect image areas within print data, and to output image block data; or
   a text detector configured to detect text areas within said print data, and to output text block data;
   an encoder configured to receive said image block data from said image detector and said text block data from said text detector, and to output image capture device control data; and
   a printer configured to receive said print data and said image capture device control data and print at least one page including at least one image capture device control mark.

2. The computer system recited in claim 1, wherein said image detector is further configured to distinguish between color images and black and white images.

3. The computer system recited in claim 2, wherein said image detector is further configured to distinguish between gray scale images and line drawing images.

4. The computer system recited in claim 1, wherein said image capture device control marks comprise bar codes.

5. The computer system recited in claim 1, wherein said image capture device control marks are printed within a control mark area.

6. The computer system recited in claim 1, wherein said image capture device control marks are printed within at least one of said text areas.

7. The computer system recited in claim 1, wherein said image capture device control marks are printed within at least one of said image areas.

8. The computer system recited in claim 1, wherein said encoder is further configured to read at least one user preference file and modify said image capture device control data in response to preferences within said user preference file.

9. A printer comprising:
   at least one of either:
   an image detector configured to detect image areas within print data, and to output image block data; or
   a text detector configured to detect text areas within said print data, and to output text block data, and
   an encoder configured to receive said image block data from said image detector and said text block data from said text detector, and to output image capture device control data;
   wherein said printer is configured to receive said print data and said image capture device control data, and to print at least one page including at least one image capture device control mark.

10. The printer recited in claim 9, wherein said image detector is further configured to distinguish between color images and black and white images.

11. The printer recited in claim 10, wherein said image detector is further configured to distinguish between gray scale images and line drawing images.

12. The printer recited in claim 9, wherein said image capture device control marks comprise bar codes.

13. The printer recited in claim 9, wherein said image capture device control marks are printed within a control mark area.

14. The printer recited in claim 9, wherein said image capture device control marks are printed within at least one of said text areas.

15. The printer recited in claim 9, wherein said image capture device control marks are printed within at least one of said image areas.

16. The printer recited in claim 9, wherein said encoder is further configured to read at least one user preference file and modify said image capture device control data in response to preferences within said user preference file.

17. A method for generating image capture device control marks comprising the steps of:
   a) detecting text within print data;
   b) when text is detected, generating text block data; and
   c) encoding said text block data into at least one image capture device control mark.

18. The method for generating image capture device control marks recited in claim 17, further comprising the step of:
   d) printing at least one page including said print data and said at least one image capture device control mark.

19. The method for generating image capture device control marks recited in claim 17, wherein said image capture device control marks are printed within control mark areas on said at least one page.

20. The method for generating image capture device control marks recited in claim 17, wherein said image capture device control marks comprise bar codes.

21. The method for generating image capture device control marks recited in claim 17, further comprising the step of:
   d) reading a user preferences file and modifying said text block data in response to preferences within said user preference file.

22. A method for generating image capture device control marks comprising the steps of:
   a) detecting images within print data;
   b) when images are detected, generating image block data; and
   c) encoding said image block data into at least one image capture device control mark.

23. The method for generating image capture device control marks recited in claim 22, further comprising the step of:
   d) printing at least one page including said print data and said at least one image capture device control mark.

24. The method for generating image capture device control marks recited in claim 22, wherein said image capture device control marks are printed within control mark areas on said at least one page.

25. The method for generating image capture device control marks recited in claim 22, wherein said detecting images step further comprises the sub-step of:
   i) detecting color images.

26. The method for generating image capture device control marks recited in claim 22, wherein said detecting images step further comprises the sub-step of:
   i) detecting black and white images.

27. The method for generating image capture device control marks recited in claim 22, wherein said detecting images step further comprises the sub-step of:
   i) detecting gray scale images.

28. The method for generating image capture device control marks recited in claim 22, wherein said detecting images step further comprises the sub-step of:
   i) detecting line drawings.

29. The method for generating image capture device control marks recited in claim 22, wherein said image capture device control marks comprise bar codes.

30. The method for generating image capture device control marks recited in claim 22, further comprising the step of:
   d) reading a user preferences file and modifying said image block data in response to preferences within said user preference file.

* * * * *

UNITED STATES PATENT AND TRADEMARK OFFICE
CERTIFICATE OF CORRECTION

PATENT NO. : 7,164,500 B2 Page 1 of 1
APPLICATION NO. : 10/060897
DATED : January 16, 2007
INVENTOR(S) : Heather N Bean et al.

It is certified that error appears in the above-identified patent and that said Letters Patent is hereby corrected as shown below:

In column 7, line 58, in Claim 1, after "either" delete ";" and insert -- : --, therefor.

In column 8, line 32, in Claim 9, after "block" delete "data," and insert -- data; --, therefor.

Signed and Sealed this

Fifth Day of May, 2009

JOHN DOLL
*Acting Director of the United States Patent and Trademark Office*